(12) United States Patent
Bayley et al.

(10) Patent No.: US 7,742,120 B2
(45) Date of Patent: Jun. 22, 2010

(54) IMAGE DISPLAY DEVICE

(75) Inventors: Paul Andrew Bayley, Hereford (GB); Niall Anthony Gallen, Cambridge (GB); Anthony Cyril Lowe, Hampshire (GB)

(73) Assignee: Shearline Precision Engineering Limited, Ely (GB)

( * ) Notice: Subject to any disclaimer, the term of this patent is extended or adjusted under 35 U.S.C. 154(b) by 1355 days.

(21) Appl. No.: 10/513,835

(22) PCT Filed: May 8, 2003

(86) PCT No.: PCT/GB03/01969
§ 371 (c)(1), (2), (4) Date: Jun. 6, 2005

(87) PCT Pub. No.: WO03/096117
PCT Pub. Date: Nov. 20, 2003

(65) Prior Publication Data
US 2005/0219148 A1 Oct. 6, 2005

(30) Foreign Application Priority Data
May 8, 2002 (GB) ................................ 0210568.2

(51) Int. Cl.
G02F 1/1333 (2006.01)
(52) U.S. Cl. ........................................................ 349/58
(58) Field of Classification Search .................... None
See application file for complete search history.

(56) References Cited

U.S. PATENT DOCUMENTS

| | | | | |
|---|---|---|---|---|
| 3,402,000 A | * | 9/1968 | Crawford | 385/116 |
| 4,747,648 A | | 5/1988 | Gilliland, III | |
| 4,874,227 A | * | 10/1989 | Matsukawa et al. | 349/73 |
| 5,009,483 A | * | 4/1991 | Rockwell, III | 385/116 |
| 5,572,034 A | * | 11/1996 | Karellas | 250/368 |
| 5,675,687 A | | 10/1997 | Wood | |
| 2002/0031973 A1 | * | 3/2002 | Hofmann et al. | 445/24 |
| 2002/0168157 A1 | * | 11/2002 | Walker et al. | 385/115 |

FOREIGN PATENT DOCUMENTS

| | | |
|---|---|---|
| EP | 0 387 034 | 9/1990 |
| EP | 0 485 235 | 5/1992 |
| EP | 0 487 509 | 5/1992 |
| EP | 0 622 658 | 11/1994 |
| JP | 2002107553 | 4/2002 |
| WO | 98/10404 | 3/1998 |

* cited by examiner

Primary Examiner—Timothy Rude
(74) Attorney, Agent, or Firm—Christensen O'Connor Johnson Kindness PLLC

(57) ABSTRACT

An image display comprises: a display device having an image output surface at which an image is displayed as a spaced array of pixel elements; an image guide (20) coupled to the image output surface of the display device and comprising a plurality of light transmission guides (80) each having an input end and an output end, the input ends of the light transmission guides being arranged relative to one another so that groups of one or more light transmission guides receive light from respective groups of one or for a cluster comprising at least a subset of the light transmission guides (80): at the outer periphery of the cluster, the input ends of the light transmission guides are constrained against expansion by a frame formed of a material having thermal expansion properties which are substantially similar to the thermal expansion properties of the image output surface.

11 Claims, 13 Drawing Sheets

IMAGE DISPLAY DEVICE

This application is a national phase of International Application No. PCT/GB03/01969 filed May 8, 2003 and published in the English language.

This invention relates to displays.

The technology behind flat-panel displays, such as liquid crystal or plasma displays, has advanced to the stage where a single display can be economically manufactured to about the screen size of a modest domestic television set. To increase the display size of a single-unit display beyond this level introduces greater costs, lower manufacturing yields and other significant technical problems.

To provide larger displays, therefore, a hybrid technology has been developed whereby multiple smaller rectangular displays are tessellated to form the required overall size. For example, a 2×2 tessellated array of 15 inch diagonal displays, with appropriate addressing electronics to route pixel information to the appropriate sub-display, would provide a 30 inch diagonal display.

A drawback of this type of arrangement is that the active area of an individual display, that is to say, the area of the front face of the display on which pixel information is displayed, does not extend to the very edge of the physical area of the display. The technologies used, whether plasma, liquid crystal or other, require a small border around the edge of the active display area to provide interconnections to the individual pixel elements and to seal the rear to the front substrate. This border can be as small as a few millimetres, but still causes unsightly dark bands across a tessellated display.

Various solutions have been proposed to this problem, most of which rely on bulk optic or fibre optic image guides to translate or expand the image generated at the active area of the individual sub-displays.

For example, U.S. Pat. No. 4,139,261 (Hilsum) uses a wedge structure image guide formed of a bundle of optical fibres to expand the image generated by a panel display so that by abutting the expanded images, the gap between two adjacent panels, formed of the two panels' border regions, is not visible. The input end of each fibre is the same size or less than a pixel element. The optical fibres are aligned, at their input ends, with individual pixel elements of the panel display, so that the pixel structure of the display is carried over to the output plane of the image expander. Other image guides formed in this way may translate the image to provide a border-less abutment between a pair of adjacent panels. Various types of light transmission guide may be used, such as rigid or semi-rigid light transmission guides. It has been proposed that the image guides should be fabricated from polymer materials, for ease of manufacture.

In order to allow the input of an image guide to be aligned correctly with a large array of pixel elements on a panel display, it is necessary that the input ends of the light transmission guides are maintained in the correct relative positions, often as a rectangular array of pixel positions. Whatever means is used for registering the input ends of the light transmission guides in their correct relative positions, a problem can arise when the temperature of the display arrangement changes.

Most commonly, panel displays are fabricated of glass or a closely related material. The surface of the panel display may have a thin layer or film of another material coupled (e.g. adhered) to it (for instance polarising filters for a Liquid Crystal (LC) display). This layer may have different thermal expansion properties to those of the underlying surface. Of course the skilled person will understand that where this is the case, the layer will expand (e.g. stretch or compress) with the underlying surface when the underlying surface expands in response to temperature variations. Image guides proposed so far tend to use polymer materials for the light transmission guides and/or for an arrangement (if one is used) for registering the input ends of the light transmission guides in the correct relative positions. A problem therefore arises because the thermal expansion properties of glass and polymer materials are different.

Consider an example display where the different thermal expansions of the input end of the image guide and of the display substrate mean that the image guide has expanded across its width by one pixel-width more than the panel substrate. This could have two major effects on the image displayed at the output of the image guide.

The first is a change to the spatial resolution of the display. At positions within the display area, some light transmission guides could be receiving substantially equal amounts of light from two adjacent pixel elements. This has a low-pass spatial filtering effect on the displayed image, and this effect will vary across the display area.

The second is that the outermost light transmission guides will be receiving no light at all, as they will have expanded beyond the display area of the panel. This will cause an unsightly dark line at the output of the image guides.

Viewed from a first aspect this invention provides an image display comprising:

a display device having an image output surface at which an image is displayed as a spaced array of pixel elements;

an image guide coupled to the image output surface of the display device and comprising a plurality of light transmission guides each having an input end and an output end, the input ends of the light transmission guides being arranged relative to one another so that groups of one or more light transmission guides receive light from respective groups of one or more pixel elements; in which, for a cluster comprising at least a subset of the light transmission guides:

at the outer periphery of the cluster, the input ends of the light transmission guides are constrained against expansion by a frame formed of a material having thermal expansion properties which are substantially similar to the thermal expansion properties of the image output surface.

In this aspect, the invention provides a physical constraint against the expansion of the input end of the image guide (or a part of it) beyond the extent defined by a frame which should have expansion properties which are generally similar to those of the image output surface. So, as the image output surface expands, so the frame should expand. If the input end of the image guide has a tendency to expand more than this, the extra expansion is taken up by the compressible coupling between the light transmission guides.

Although they could be loose from one another, for example only being attached to the image output surface, it is preferred that the input ends of light transmission guides within the cluster are coupled to one another by a compressible coupling such as a compressible adhesive.

In order to approximate the expansion properties of a typical glass display, it is preferred that the frame is formed of a glass or metal material.

Preferably the cluster comprises substantially all (e.g. all) of the light transmission guides.

Viewed from a second aspect this invention also provides an image display comprising:

a display device having an image output surface at which an image is displayed as a spaced array of pixel elements;

an image guide coupled to the image output surface of the display device and comprising a plurality of light transmission guides each having an input end and an output end, the input ends of the light transmission guides being arranged relative to one another so that each light transmission guide receives light from respective groups of one or more pixel elements; in which:

the input ends of the light transmission guides are individually coupled to respective areas on the image output surface; and the input ends of the light transmission guides are not coupled to one another along a predetermined distance measured from the input ends.

The invention addresses the problems described above by allowing some freedom of movement (or rather, bending) of the input ends of the light transmission guides. This is achieved by not joining the input ends together of a portion of their length, but joining them individually to the image output surface of the display. So, if there is a slight differential expansion causing relative movement between the image output surface and the input ends of the light transmission guides, this is accommodated by a slight distortion of the uncoupled lengths of the light transmission guides.

Viewed from a third aspect this invention also provides an image display comprising:

a display device having an image output surface at which an image is displayed as a spaced array of pixel elements over an active pixel region of the image output surface;

an image guide coupled to the active pixel region of the image output surface and comprising a plurality of light transmission guides each having an input end and an output end, the input ends of the light transmission guides being arranged relative to one another so that groups of one or more light transmission guides receive light from respective groups of one or more pixel elements; in which:

the image output surface has further pixel elements disposed around the periphery of the active pixel region; and the image guide can expand thermally so that the input of the image guide encompasses the further pixels.

In this aspect, the invention addresses the problems described above by providing, in effect, extra pixels at the outer periphery of the active pixel region. So, if there is a differential expansion causing the input of the image guide to expand beyond the extent of the active pixel region, there is still some light launched into the outermost light transmission guides of the image guide. This avoids the unsightly black line referred to above.

To allow for a typical level of differential expansion, it is preferred that the image output surface has further pixel elements disposed around the periphery of the active pixel region over a guard band region narrower than the input end of a light transmission guide.

Preferably each light transmission guide is arranged to receive light from two or more pixel elements.

To further reduce the visibility of an expansion of the image guide beyond the active pixel region, it is preferred that the further pixels are arranged to display substantially the same picture information as nearby (e.g. adjacent) pixels within the active pixel region or, alternatively (in a tiled or similar system), to display duplicate information to that of the peripheral pixels within the active pixel region of an adjacent display.

Preferably the light transmission guides are coupled to the image output surface using an adhesive, although they could alternatively be held in place by a mechanical arrangement such as a clip.

Although the invention is suitable for use with display devices such as cathode ray tube devices, it is preferred that the display device is a panel display device such as a liquid crystal panel display device.

The invention is particularly suitable for use when the image output surface is formed of a glass material and/or the light transmission guides are formed of a polymer or plastics material.

The invention also provides an array of image displays as defined above, arranged so that viewing surfaces formed by the output ends of the image guides abut to form a larger composite viewing surface.

Viewed from a fourth aspect this invention also provides an image display comprising:

a display device having an image output surface at which an image is displayed as a spaced array of pixel elements over a plurality of separated active pixel regions of the image output surface;

an image guide coupled to the active pixel regions of the image output surface and comprising a plurality of light transmission guides each having an input end and an output end, the input ends of the light transmission guides being arranged relative to one another so that groups of one or more light transmission guides receive light from respective groups of one or more pixel elements and the output ends of the light transmission guides forming a contiguous output surface; in which:

the input ends of the light transmission guides are arranged into a plurality of sections, each section being associated with a different one of the active pixel regions of the image output surface, the light transmission guides in each section being coupled to the active pixel region associated with that section.

In this aspect, the invention provides gaps between active regions on the image output surface. In a preferred embodiment, the image guide is able to expand into this gap, reducing the degree of misregistration occurring under conditions of thermal expansion of the image guide. In an alternative preferred embodiment, there is provided a registration aid having thermal expansion properties substantially similar to those of the structure determining the expansion of the image output surface, to which the image guide is abutted. The registration aid is provided between the active areas of the image output surface and acts to minimise misregistration.

Viewed from a fifth aspect this invention also provides an image display comprising:

a display device having an image output surface at which an image is displayed as a spaced array of pixel elements over an active pixel region of the image output surface;

an image guide coupled to the active pixel region of the image output surface and comprising a plurality of light transmission guides each having an input end and an output end, the input ends of the light transmission guides being arranged relative to one another so that groups of one or more light transmission guides receive light from respective groups of one or more pixel elements, the light transmission guides being coupled together along at least a portion of their length; in which:

the image guide is coupled to the image output surface over less than the whole active pixel region of the image output surface, the image guide being coupled to the image output surface such that the image guide can expand with respect to the area coupled.

In this aspect the invention aims to reduce mechanical distortion in, for instance, an adhesive layer coupling the image output surface and the image guide together. The reduction in mechanical distortion during variations in temperature reduces the presence of adverse effects in image quality and the probability of failure of the adhesive bond. In one preferred embodiment, reference points are provided to prevent rotational displacement of the image guide with respect to the image output surface. In an alternative preferred embodiment, a plurality of separate active regions are provided on the image output surface, with each of a number of groups of light transmission guides being attached to an active regions. With this arrangement, rotational displacement is controlled because the image guide as a whole is attached to the image output surface at a plurality of locations.

Various other respective aspects and features of the invention are defined in the appended claims. Features from the dependent claims may be combined with features of the independent claims as appropriate and not merely as explicitly set out in the claims.

Embodiments of the invention will now be described, by way of example only, with reference to the accompanying drawings in which.

Figure 7:
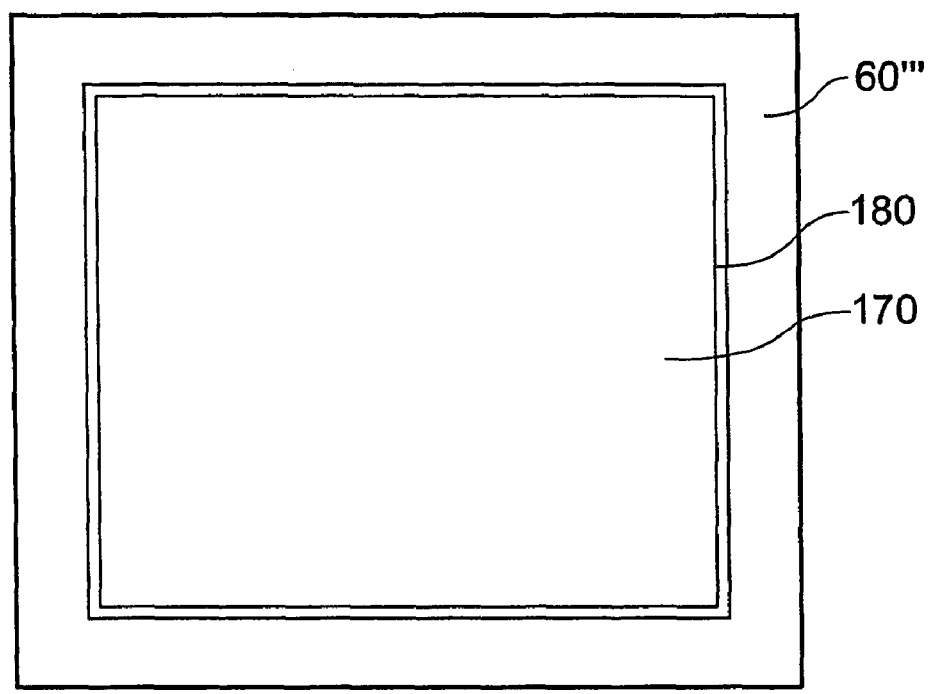
Figure 8:
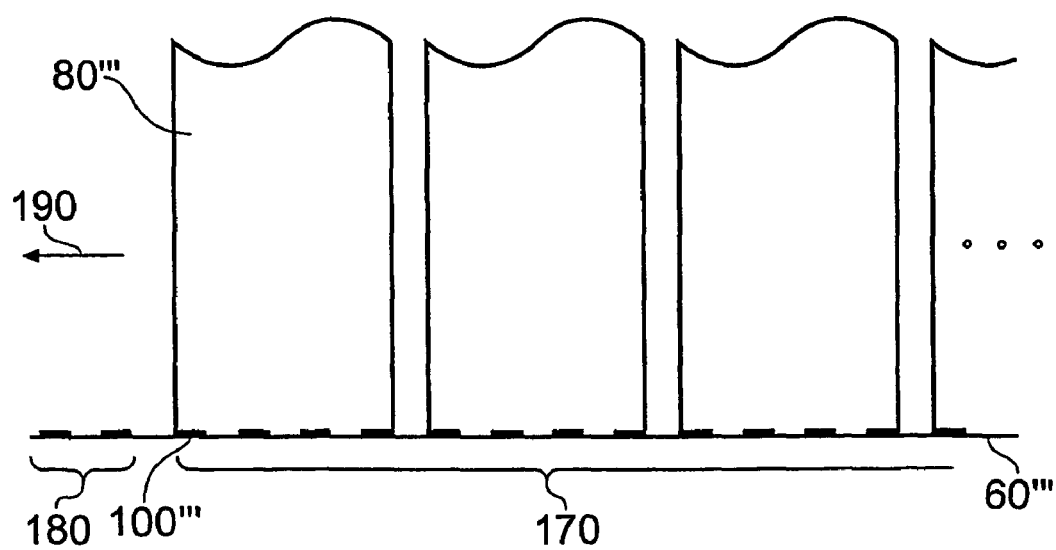
Figure 9:
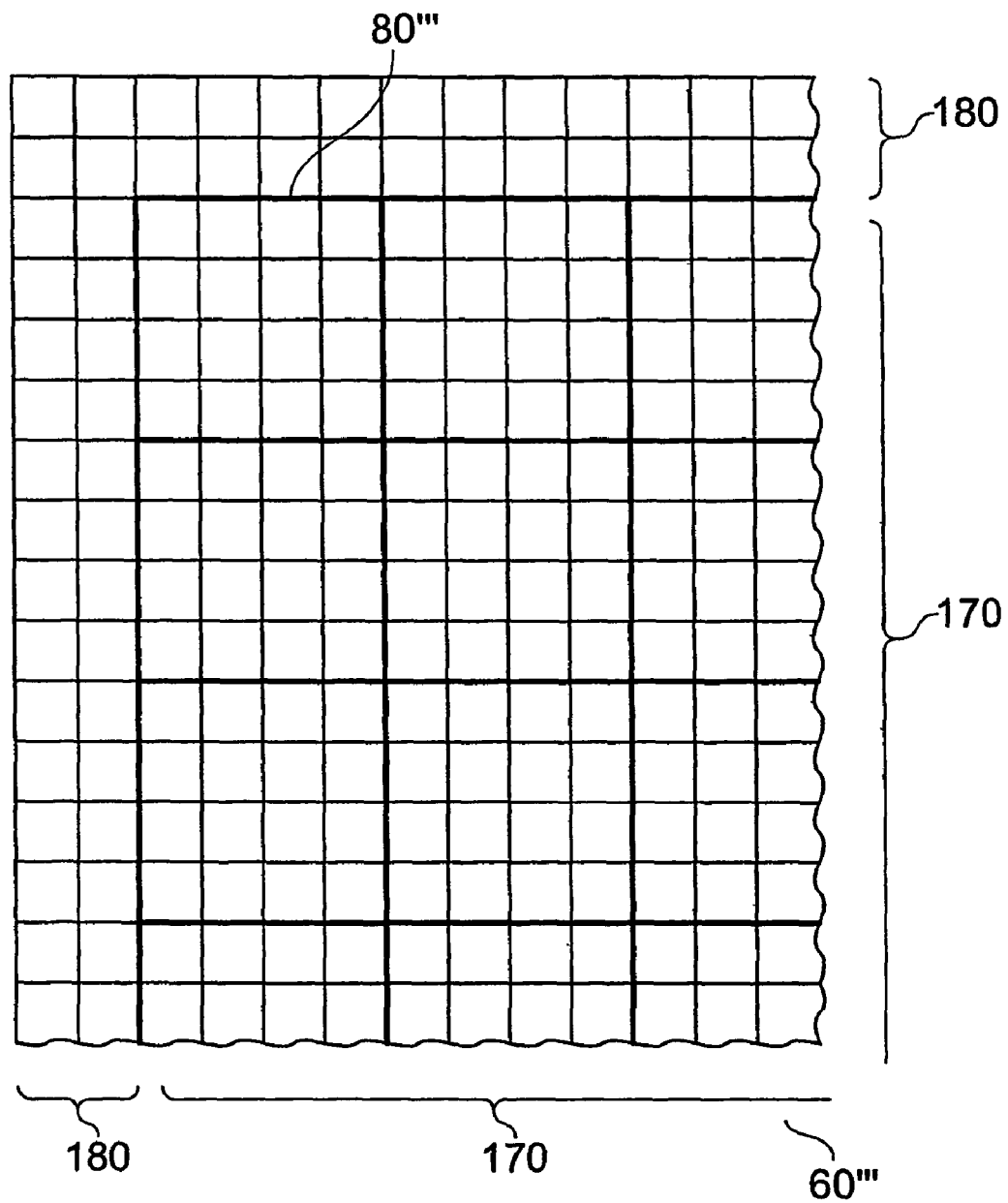
Figure 10:
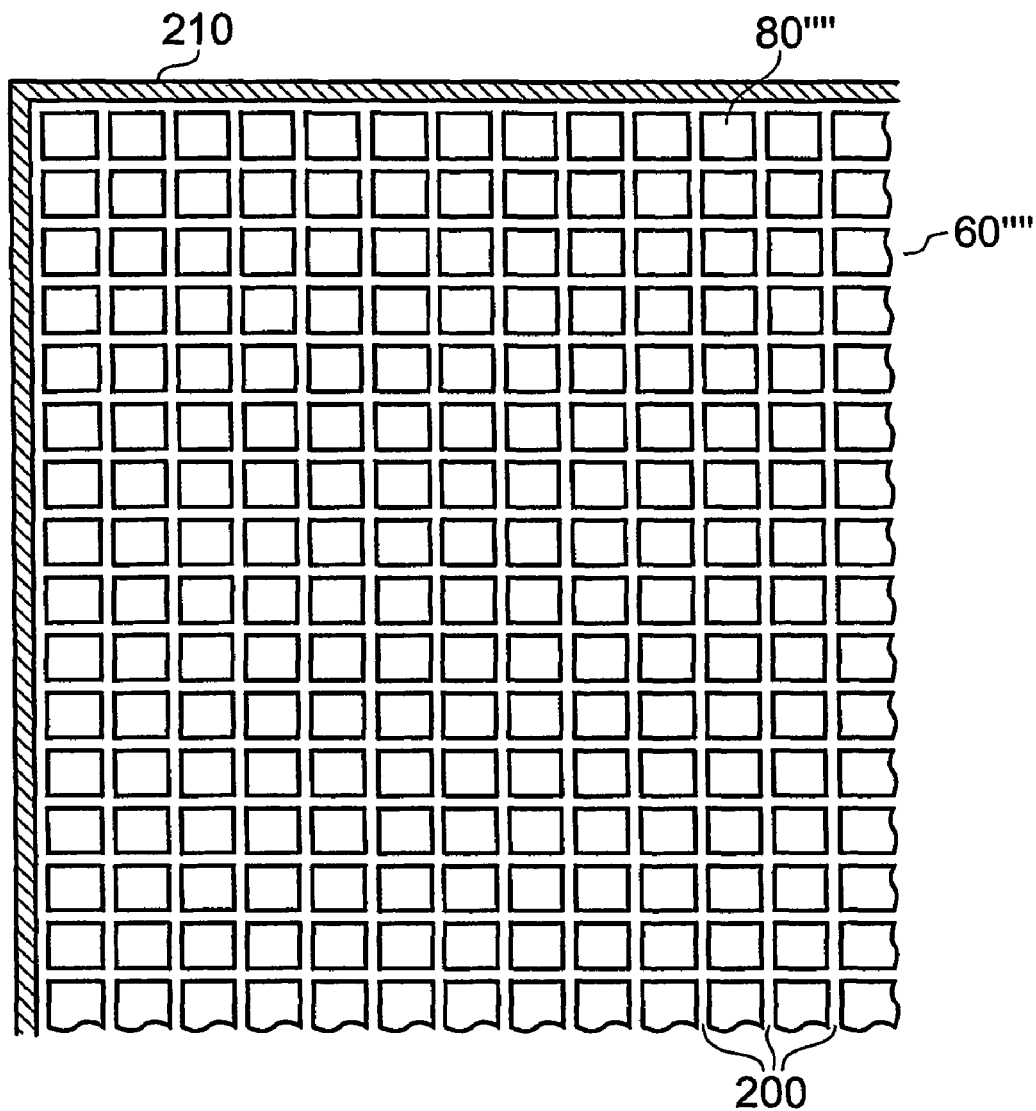
Figure 11:
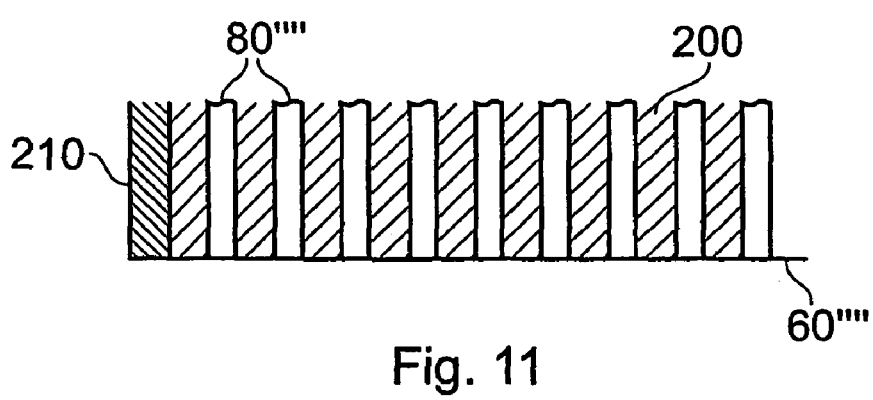
Figure 12A:
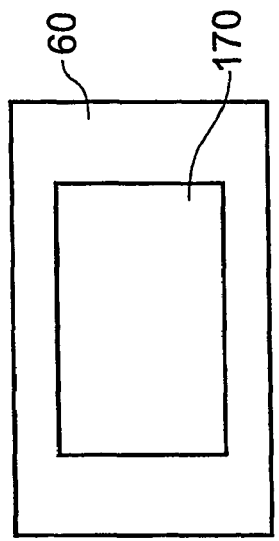
Figure 12B:
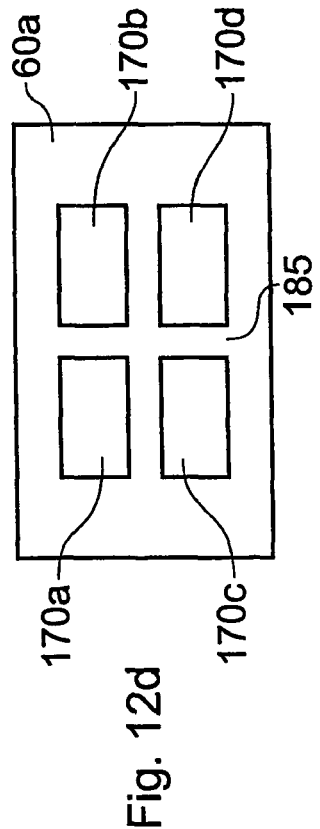
Figure 12D:
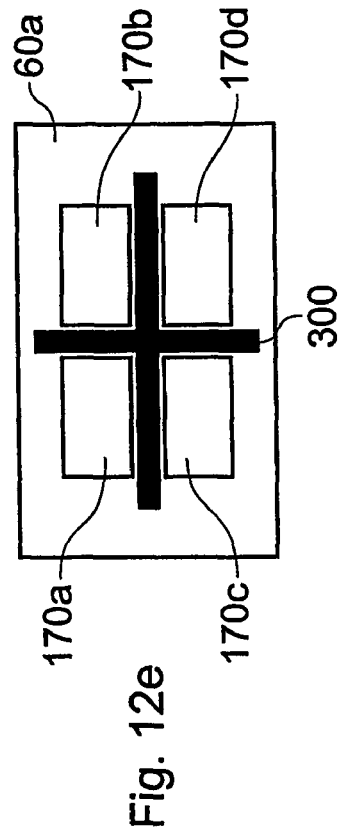
Figure 12E:
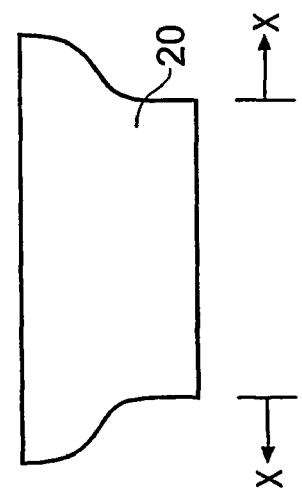
Figure 12C:
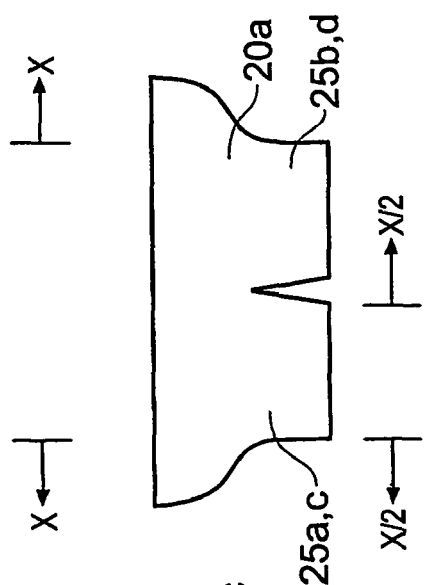
Figure 14:
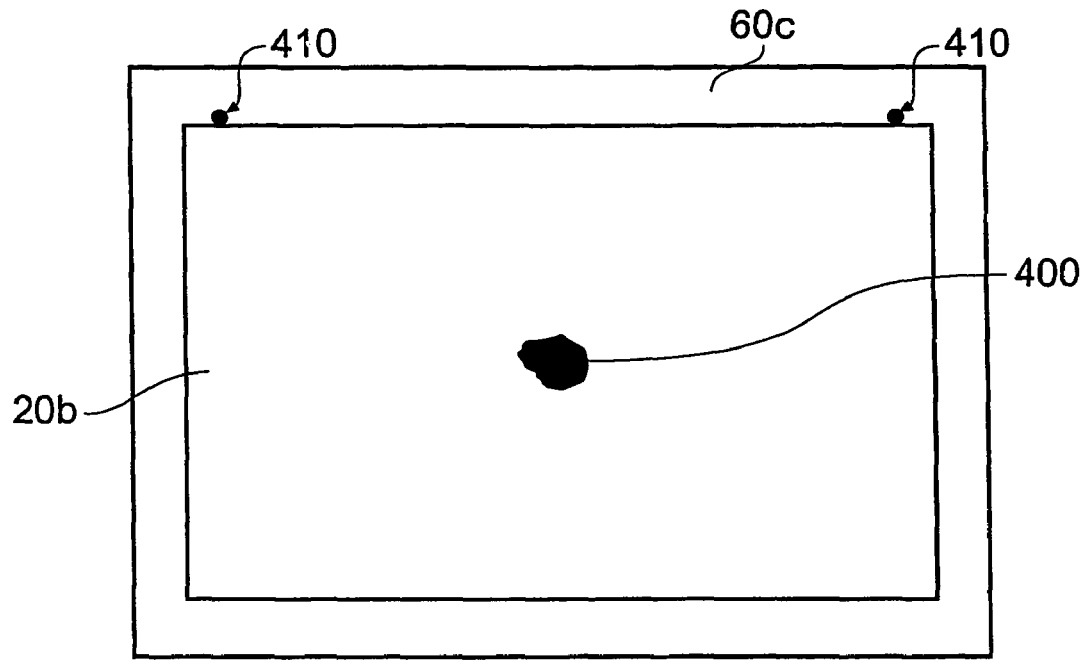
Figure 15:
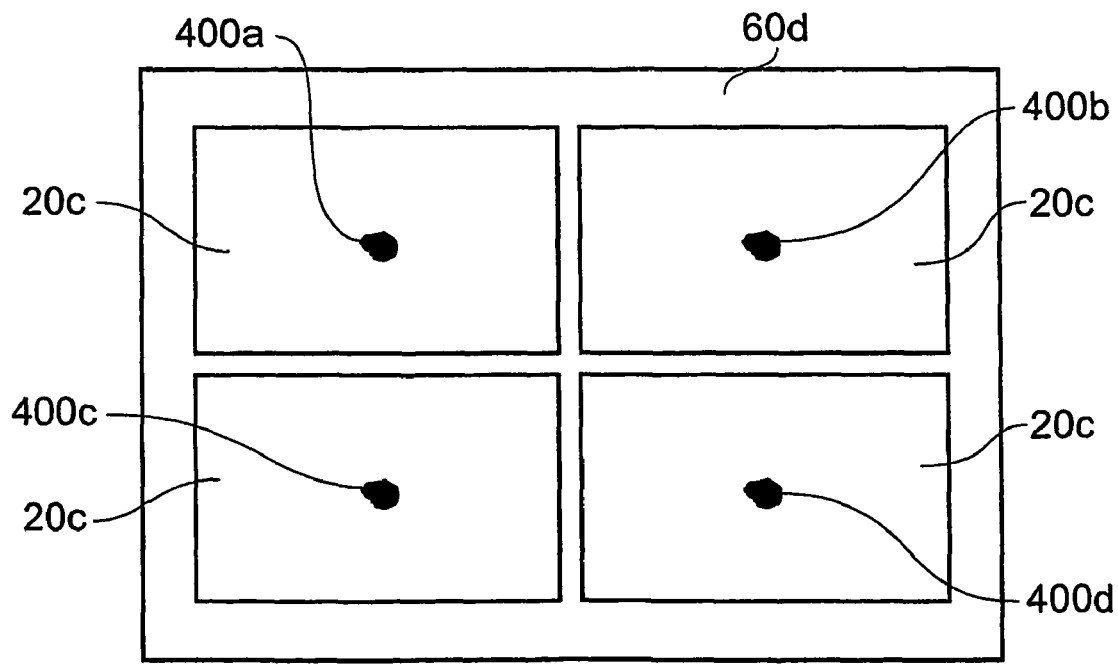
Figure 16A:
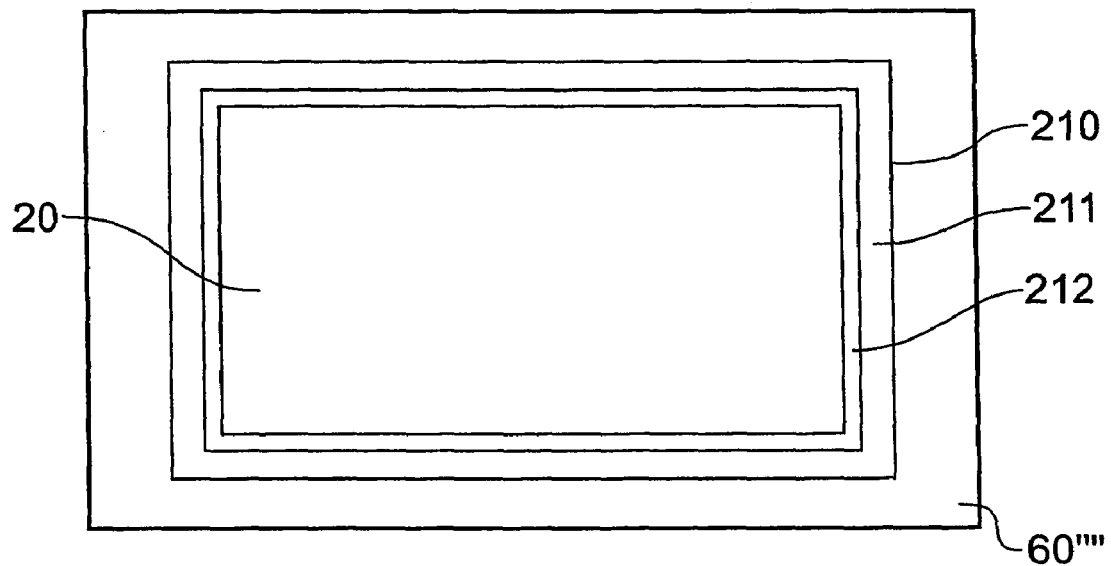
Figure 16B:
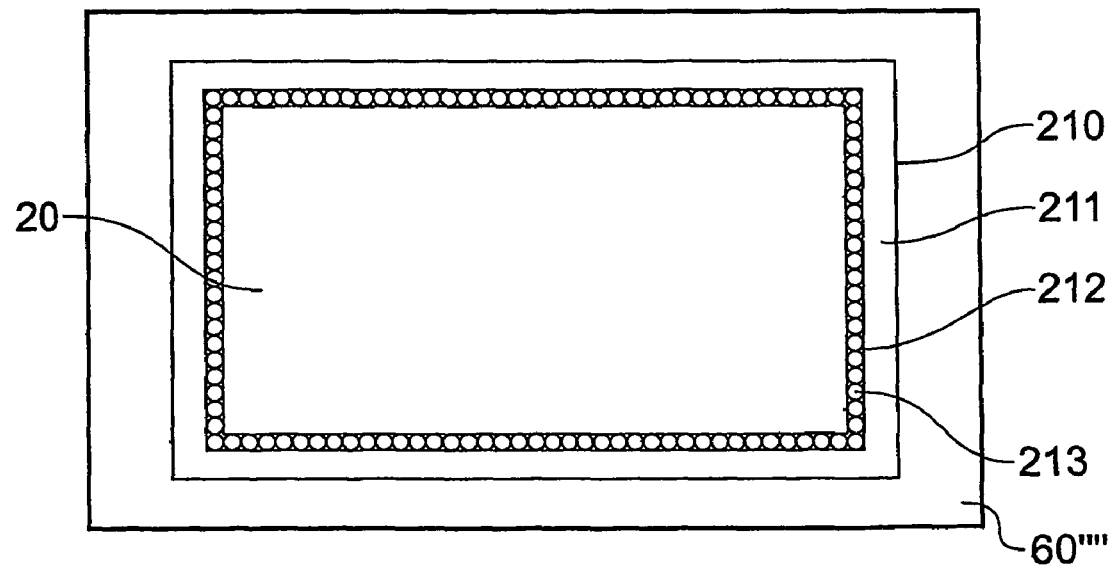
Figure 17A:
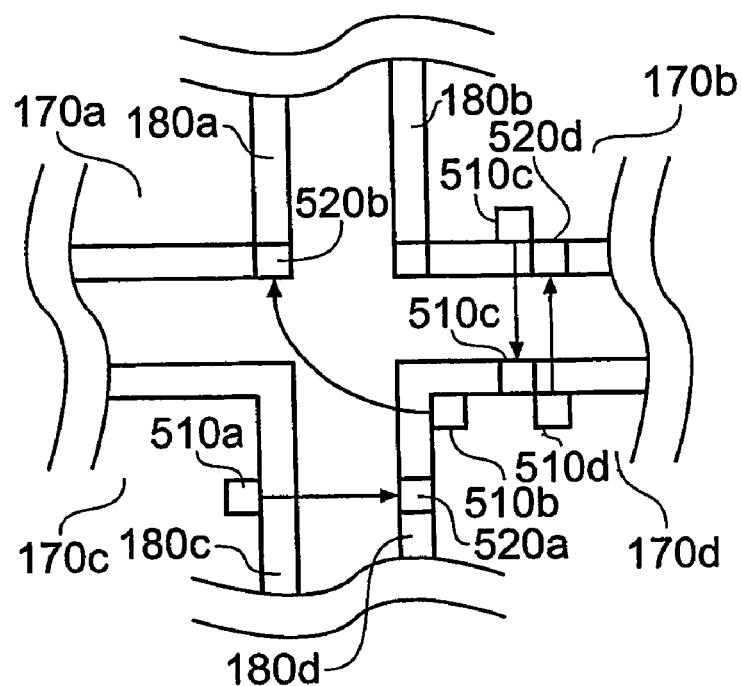
Figure 17B:
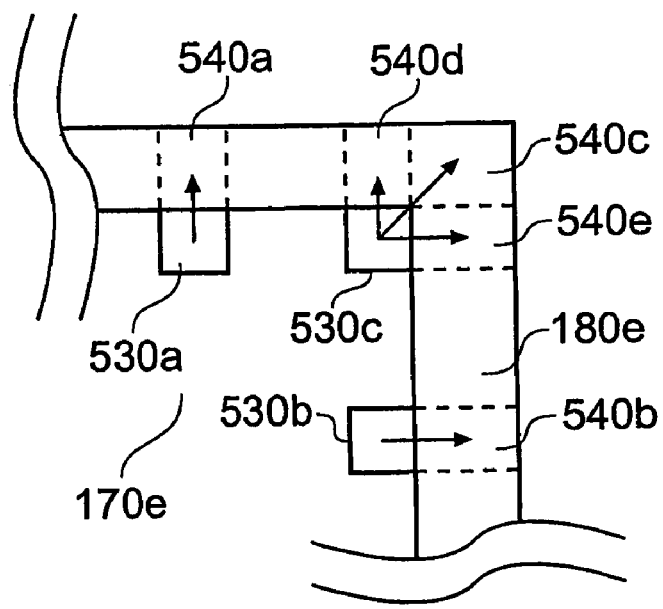
Figure 18:
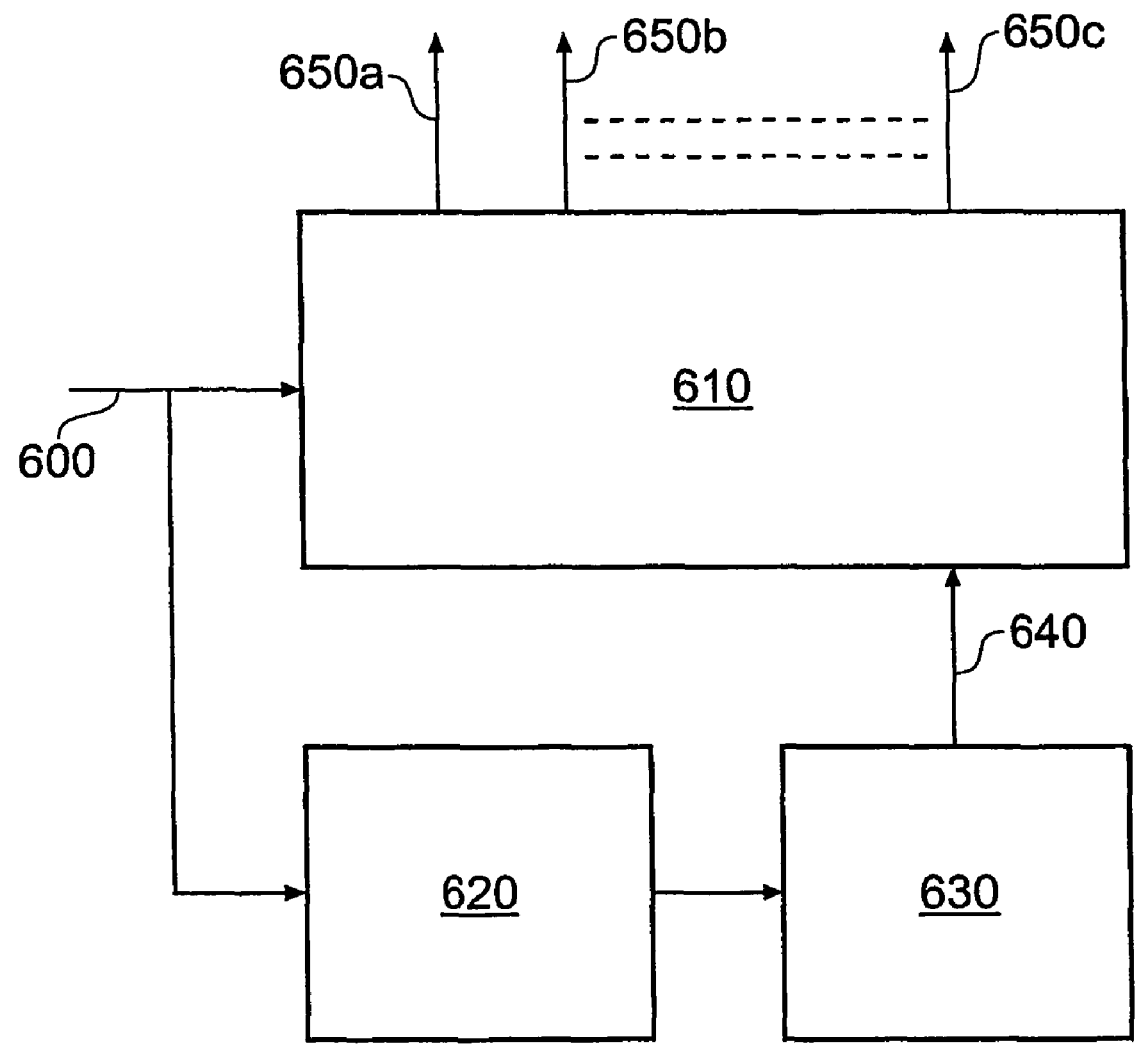

FIG. 7 schematically illustrates the image output surface of a display panel having an active pixel region and a guard band;

FIG. 8 is a schematic side elevation of an array of light transmission guides coupled to the image output surface of FIG. 7, in accordance with a third embodiment of the present invention;

FIG. 9 is a schematic plan view of the arrangement of FIG. 8;

FIG. 10 is a schematic plan view of an array of light transmission guides coupled to an image output surface, in accordance with a fourth embodiment of the present invention;

FIG. 11 is a schematic side elevation of the arrangement of FIG. 10;

FIGS. 12a and 12b schematically illustrate a side elevation of a light guide and a plan view of an image output surface in accordance with the first to fourth embodiments of the present invention;

FIGS. 12c to 12e are a schematic side elevation of a light guide and schematic plan views of an image output surface in accordance with a fifth embodiment of the present invention;

FIGS. 13a to 13d are schematic plan views of a selection of registration aids applicable to the arrangement of FIG. 12e;

FIG. 14 is a schematic plan view of an image output surface and the input ends of a light guide in accordance with a sixth embodiment of the invention;

FIG. 15 is a schematic plan view of an image output surface and the input ends of a light guide (split into a plurality of groups) in accordance with a seventh embodiment of the invention;

FIG. 16a is a schematic plan view of an image output surface and registration aid in accordance with an eighth embodiment of the invention;

FIG. 16b is a schematic plan view of an image output surface and registration aid in accordance with a ninth embodiment of the invention;

FIGS. 17a and 17b schematically illustrate two alternative modes of operation of a guard band in accordance with embodiments of the invention; and FIG. 18 schematically illustrates tiled display control circuitry in accordance with an embodiment of the invention.

Figure 1:
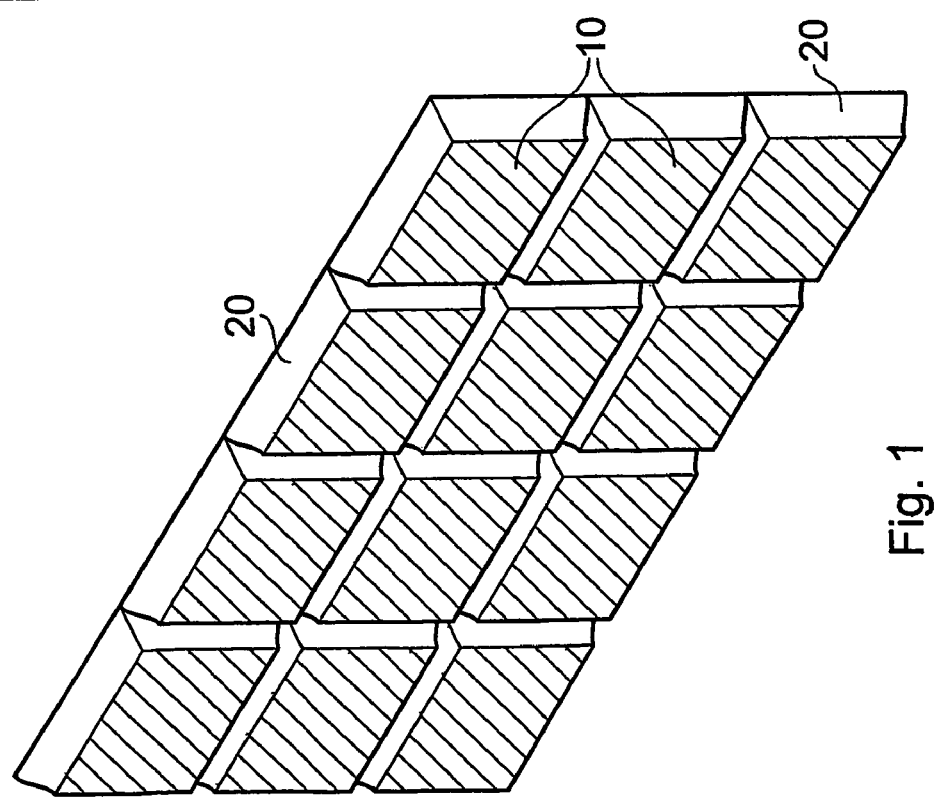
FIG. 1 is a schematic isometric rear view of a tiled array of display panels.

FIG. 1 is a schematic isometric rear view of a tiled array of display panels.

The array comprises four display panels in a horizontal direction and three display panels in a vertical direction. Each display panel comprises a light emitting surface 10 and an image guide 20.

The light emitting surfaces 10 are each arranged as a plurality of pixels or picture elements. In practice, they would include, for example, a back light arrangement, focusing, concentrating and/or collimating and/or homogenising optics and a liquid crystal panel or the like, but much of this has been omitted for clarity of the diagram.

The panels each display portions of an overall image to be displayed. The portions represent adjacent tiles in a tessellated arrangement. However, because of the need to run electrical connections and physical support around the edge of the light emitting surfaces 10, they cannot be directly abutted without leaving a dark band or "black matrix" in between. So, the light guides 20 are used to increase the size of the image from each light emitting surface 10 so that the output surfaces of the light guides 20 can be abutted to form a continuous viewing plane.

Figure 2:
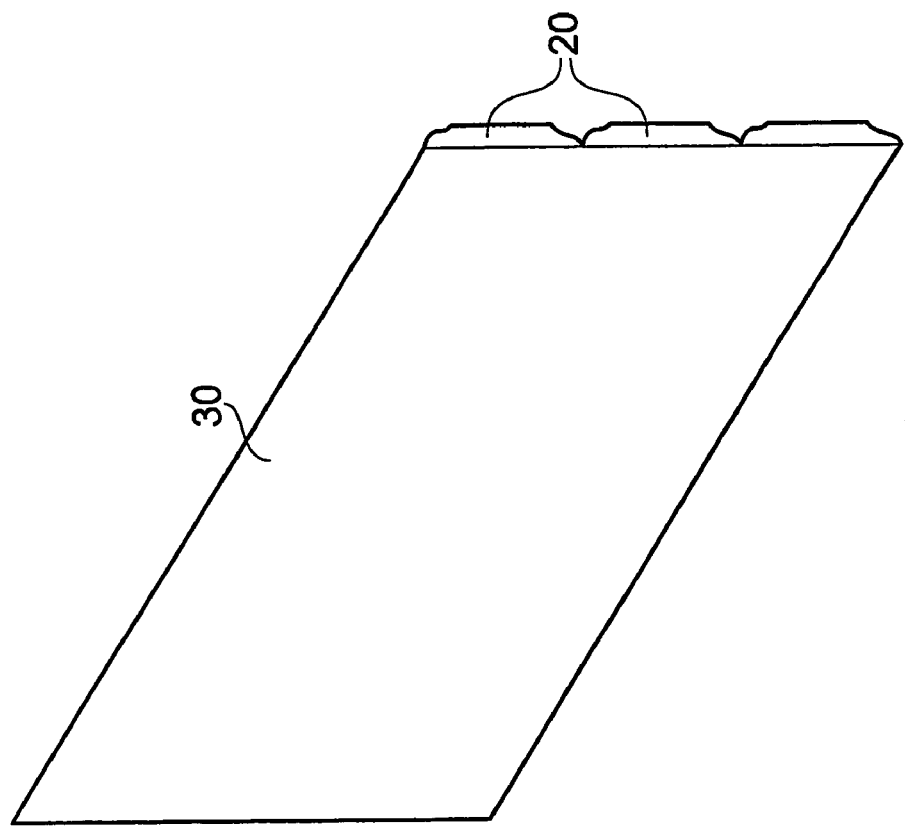
FIG. 2 is a schematic isometric front view of the array of FIG. 1.

This arrangement is shown in FIG. 2 which is a schematic isometric front view of the array of FIG. 1. Here, the output surfaces of the light guides 20 abut so as to form a substantially continuous viewing surface 30.

Figure 3:
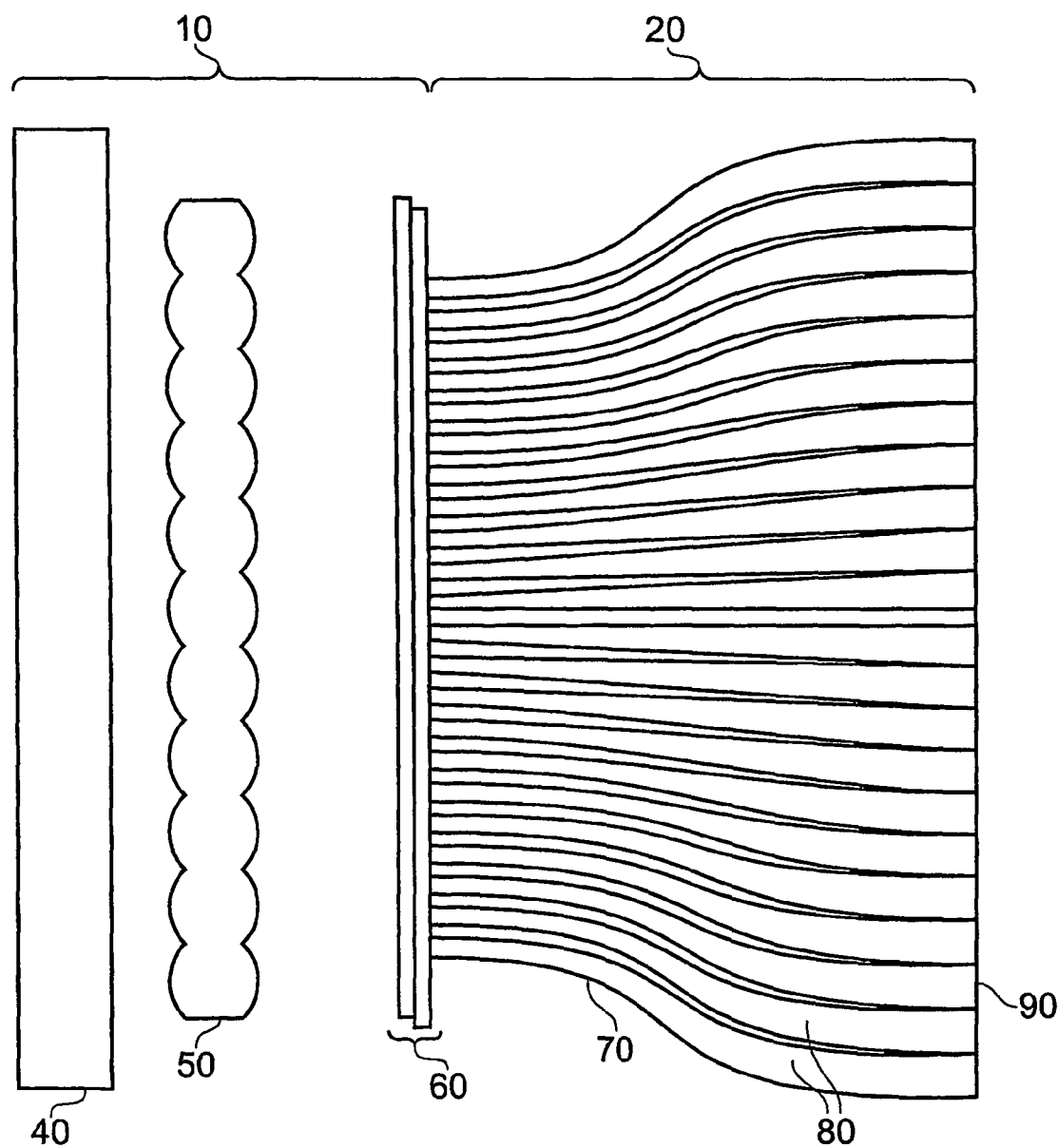
FIG. 3 is a schematic side view of a display comprising a light source, a collimator/homogeniser, a display panel and an image guide.

FIG. 3 is a schematic side view of a display comprising a light source 40, a collimator/homogeniser 50, a liquid crystal panel 60 and a light guide 70.

The light source 40 and the homogeniser 50 are shown in highly schematic form but in general terms are arranged to provide the back light required by the liquid crystal panel 60.

The liquid crystal panel 60 may be of a type which uses a white or other visible colour back light and provides liquid crystal picture elements to modulate that back light for that display. Alternatively, the liquid crystal panel 60 may be a photo luminescent panel which employs an ultra-violet back light and modulates the ultra-violet light onto an array of phosphors to generate visible light for display. Of course, many other types of light emitting surface 10 may be used such as an organic light emitting diode array or even a cathode ray tube display. A typical example of the surface material of the display might be Corning LCD Glass.

The image guide 70 comprises an array of light transmission guides 80, each of which carries light from a particular area on the liquid crystal panel 60 to a corresponding particular area on an output surface 90. In doing so, the light transmission guides are arranged to diverge so that the area covered on the output surface 90 is physically larger than the image display area on the liquid crystal panel 60. This, as described above, allows an array of displays as shown in FIG. 3 to be abutted without an unsightly black matrix at the viewing plane.

Some examples of materials used to fabricate the light transmission guides are Bayer Makrolon Polycarbonate and Dow Caliber Polycarbonate.

Figure 4:
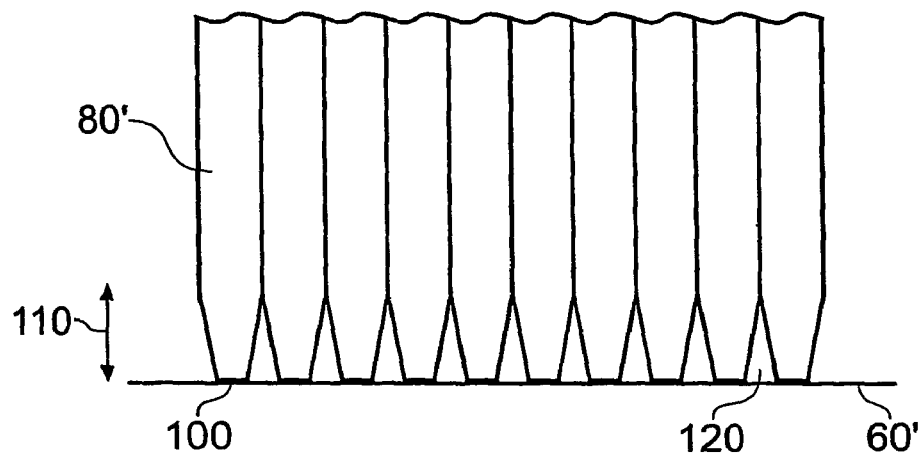
FIG. 4 is a schematic side elevation of an array of light transmission guides coupled to an image output surface, in accordance with a first embodiment of the present invention.

FIG. 4 is a schematic side elevation of an array of light transmission guides 80' forming part of the image guide 20. The light transmission guides 80' are coupled, for example glued by a transparent adhesive, to pixel elements 100 of a display panel 60'. In the example shown in FIG. 4, each light transmission guide 80' is coupled to a respective individual pixel element 100. However, in this and other embodiments to be described, each light transmission guide could be coupled to several pixels (for example, a group of one or more each of red, green and blue pixels) or each pixel could be coupled to several light transmission guides.

It will be appreciated throughout this description that the term "coupled to a pixel element" is to be understood in the context of a panel or other display. In the strictest sense, in for example a liquid crystal display, the "pixel element" could be considered to be actually within the sandwich structure of the various layers constituting the display. However, using the term in an engineering sense, the skilled person will of course understand that the light transmission guides are in fact coupled to positions on the outer surface of the display which receive light from the pixel element.

Examples of suitable transparent adhesives for this purpose are as follows:

| | |
|---|---|
| Epoxy Technology | Epotech OG134 |
| Hughes Associates | Epoxy 330 |
| Norland | NOA61 |

Over a portion 110 of the length of the light transmission guides 80', the light transmission guides are separate from one another. The gaps 120 between the light transmission guides may be filled by air, near-vacuum, an inert gas, or even a low density flexible filler such as a silicone elastomer.

This arrangement allows the input ends of the light transmission guides 80' to track any differential expansion between the image guide 20 and the image output surface of the display 60' by a very slight distortion such as a bending or buckling at the input end. So, even if the image output surface 60' and the image guide expand laterally by different amounts, each light transmission guide remains registered and in contact with the correct one of the pixel elements 100.

The length of the unjoined region 110 depends on the dimensions of the light transmission guides, their flexibility, and the strength of the bond between the light transmission guides 80' and the pixel elements 100 on the image output surface 60'. The range of temperatures over which the performance of the display is specified is also relevant. The skilled person may establish an appropriate length of the region 110 by routine experiment once these parameters are established.

Figure 5:
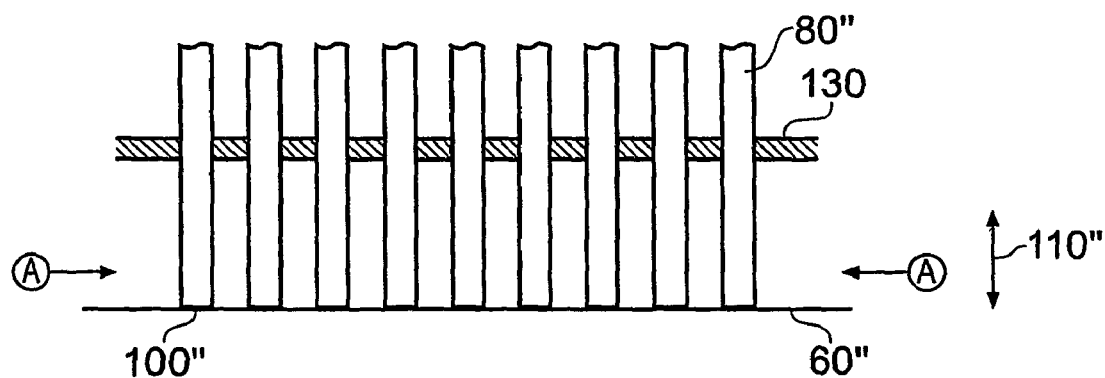
FIG. 5 is a schematic side elevation of an array of light transmission guides coupled to an image output surface, in accordance with a second embodiment of the present invention.

FIG. 5 is a schematic side elevation of an array of light transmission guides 80" coupled to an image output surface 60" in accordance with a second embodiment of the present invention.

As before, each light transmission guide 80" is coupled to a respective individual pixel element 100" but other arrangements are of course possible.

The light transmission guides 80" are substantially independent over much of their length, being (for example) discrete optical fibres. However, a support 130 is provided along the length of the light transmission guides 80", partly to help support the weight of the light transmission guides and also to assist in aligning each light transmission guide to the appropriate place on the image output surface 60" during assembly of the display arrangement. The position of the support 130 defines a distance 110" over which the light transmission guides are not coupled to one another. Again, this distance allows for differential thermal expansion between the image output surface 60" and the image guide.

Figure 6:
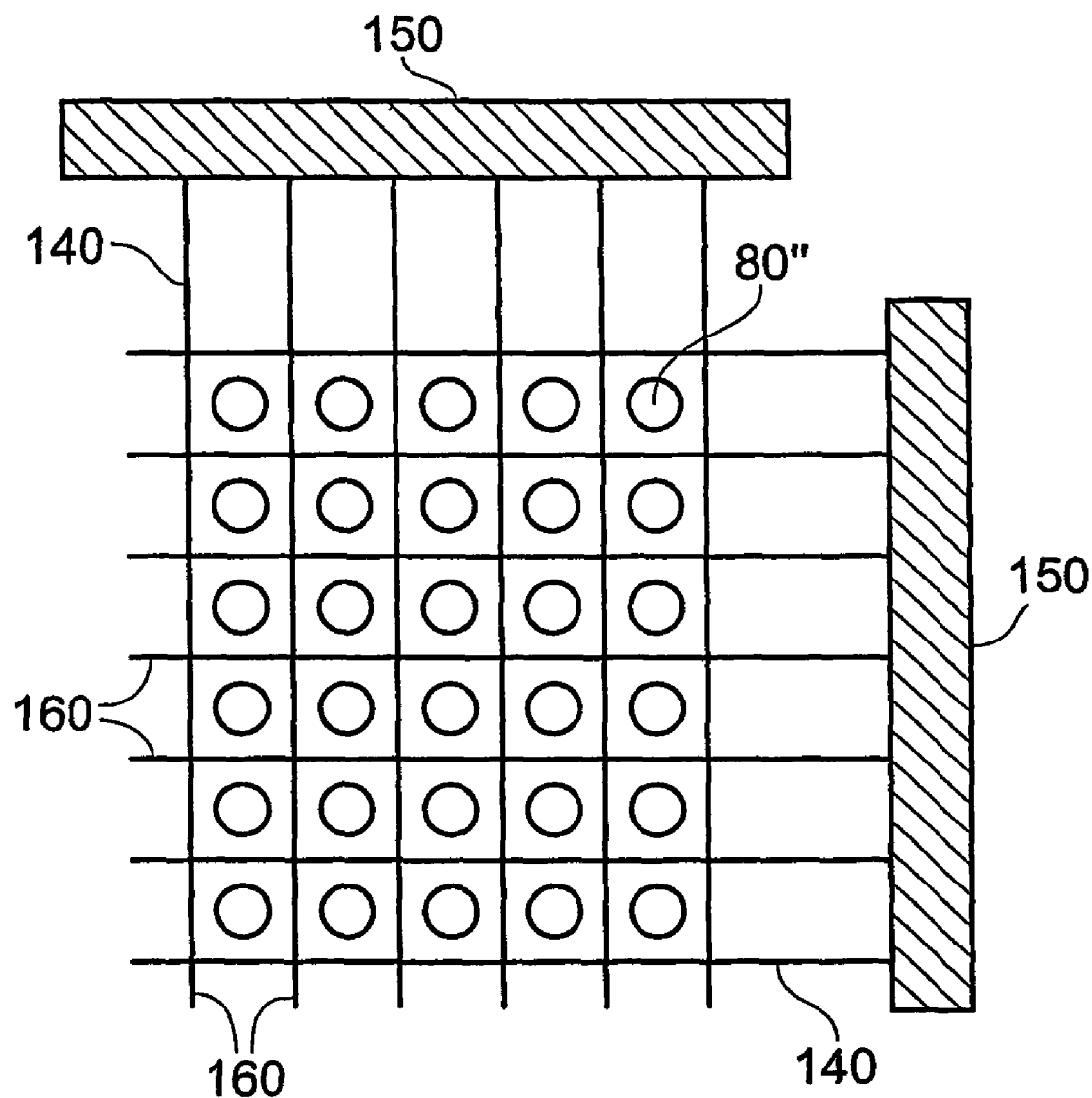
FIG. 6 is a schematic plan view at a level A-A during the assembly of an array as shown in FIG. 5.

If substantially flexible light transmission guides 80" are used, then in the case of a display having a large number of pixel elements 100", it is useful to provide a technique for assembling the input ends of the light transmission guides 80" to the correct place for gluing on to the image output surface 60". FIG. 6 schematically illustrates such a technique and is a schematic plan view taken along a section A-A of FIG. 5.

Referring to FIG. 6, each light transmission guide 80" is held in place laterally by crossed sets of wires or blades 140. The crossed sets of wires or blades define (in this example) square apertures in which each light transmission guide 80" sits during the process of gluing the light transmission guide on to the appropriate pixel position on the image output surface 60".

The wires or blades 140 are supported at one end on a support member 150. This holds them at the correct spacing for the pixel elements of the display panel in use. If fine blades are used, these may be self-supporting along their length and so no support is needed at the distal end of each blade. If some distal support is needed, then the blades may be held by a clamp or an electromagnetic support to allow for an easy release.

So, the two sets of blades 140 are inserted in orthogonal directions through the array of light transmission guides 80" close to the surface of the panel display. If necessary, the blades are held at their distal ends to maintain the correct spacing and to give structural rigidity during the gluing process. An adhesive is applied to the surface of the panel display and the image output surface 60" is offered up to the array of light transmission guides 80". An image may be displayed on the image output surface 60" during this process to assist in obtaining the correct lateral positioning. Once the image output surface 60" is in the correct position with respect to the array of light transmission guides 80", the adhesive is cured, for example by exposure to ultra-violet light, by heat or simply by time elapsing. Then, if any support was used at the distal ends of the blades 140, the support is released and the blades are carefully withdrawn along their length.

If flexible wires are used instead of rigid or semi-rigid blades, some tension is required between the support member 150 and an arrangement used to grip the wires at their distal ends, in order to maintain the correct spacing along the length of the wires. In this case, the distal end of each wire may be passed into a respective spaced groove in a further support member (not shown), clamped in place and then pulled to place the wire under tension. The process would then continue as described above, but at the end of the assembly the tension would be released and the wires allowed to leave the respective grooves.

A third embodiment of the invention will now be described. FIG. 7 schematically illustrates the image output surface 60''' of a display panel having an active pixel region 170 which contains all of the pixels needed for an appropriate connection to an image guide, and a so-called "guard band" 180 formed of extra pixels disposed around the peripheral edge of the active pixel region 170.

The guard band provides additional pixels to give some light input into the very outer light transmission guides of the image guide, in the case that the image guide expands laterally beyond the active pixel region 170. If this does happen, then the precise registration between each light transmission guide and the respective one or more pixel elements on the image output surface will be lost, and this could lead to some undesirable spatial low-passed filtering across the image. However, by providing the guard band 180 having additional pixel elements, at least an unsightly dark line around the edge of the image guide is avoided.

In this embodiment, pixels in the guard band 180 display the same colour and luminance as the nearest adjacent pixels in the active pixel region 170. So, some pixel information is duplicated around the edge of the display, but again this is less undesirable than an unsightly dark band around the output of the image guide.

In other embodiments, the pixels in the guard band 180 display the same colour and luminance as the nearest adjacent pixels in the next adjacent display in a tiled array of displays as shown in FIG. 1.

Two alternative modes of operation of the guard bands of a display will now be described with reference to FIGS. 17a and 17b. FIG. 17a is a schematic illustration of a first mode of operation of the guard bands of a tiled display comprising four tiles. Each tile comprises an active area 170a, b, c and d and a guard band area 180a, b, c and d. In this mode of operation, pixels 520a, b, c and d in a given guard band 180a, b, c or d will display the same information as the nearest neighbouring pixels in the active areas 170a, b, c or d of a neighbouring tile. For instance, the guard pixel 520a which lays on the edge of the active area 170d will display the same information as the pixel 510a in the active area 170c. Similarly, the guard pixel 520c and the guard pixel 520d (laying on the edge of active areas 170b and 170d respectively) will display the same information as the pixels 510c and 510d respectively (these pixels being part of the active areas 170d and 170b respectively). In the case of the guard pixel 520b, which lays on the corner of the active area 170a, the guard pixel 520b will display the same information as the corner pixel 510b of the diagonally adjacent active area 170c. This is in contrast to the previous cases where the information is taken from an active area either horizontally or vertically adjacent to the guard area.

FIG. 17b is a schematic illustration of a second mode of operation of a guard band. This mode of operation may apply to either a single display, or to a tiled display. Here, the information to be displayed by the pixels 540a, b, c, d and e in a guard band 180e matches the information to be displayed by the closest pixels 530a, b or c in an active area 170e around which the guard band 180e is formed. For instance, the information used to drive the pixel 530a, located on one edge of the active area 170e will also be used to drive the neighbouring pixel 540a. Similarly, the information used to drive the pixel 530b, located on another edge of the active area 170e will also be used to drive the neighbouring pixel 540b. In the case of the pixel 530c, located on a corner of the active area 170e, the information driving this pixel will also be used to drive the guard band pixels 540c, d and e.

Experimentation has shown that where pixels in the guard band 180 display the same colour and luminance as the nearest adjacent pixels in the active pixel region 170, this provides preferable visual image properties for text/graphics-based image data (here, the term "text/graphics" is used to signify hand-drawn or computer-generated material (graphs, letters etc) which have the characteristic of rapid contrast and/or hue changes (in the spatial domain), whereas other images (photographs, paintings etc) have (generally) more gradual spatial changes of contrast and/or hue. On the other hand, where the pixels in the guard band 180 display the same colour and luminance as the nearest adjacent pixels in the next adjacent display, this provides preferable visual image properties for non-text/graphics image data.

A single image frame to be displayed over an array of tiled displays may include regions comprising text/graphics and regions without text/graphics. In this case, it is desirable that guard band pixels falling within regions comprising text/graphics should be written to duplicate the colour and luminance of the nearest adjacent pixels in the active region 170 and that guard band pixels falling within regions without text/graphics (or with only small amounts of text/graphics) should be written to duplicate the colour and luminance of the nearest adjacent pixels in the next adjacent display.

Both the guard bands, and the regions of the active areas used to drive them, are not necessarily limited to a single width of pixels, but may include a plurality of rows and columns.

Preferably, the basis on which the colour and luminance of the guard band pixels is determined (i.e. the mode of operation) is selectable. In particular, the mode of operation may be either auto-selectable by control circuitry in the display device, or manually selectable by a user.

The display may include an electronic detector operable to detect the type of information being displayed (e.g. text/graphic or image only) and to write the guard band pixels appropriately. More specifically, the type of information displayed at each inter-tile boundary can be analysed, and the guard band of each tile can be written accordingly. The electronic detector may be included in the control circuitry driving the display. An example display controller operable to detect and isolate text/graphic regions from other image regions is the Phillips SAA6713 display controller.

FIG. 18 schematically illustrates example control circuitry which may be used to drive a tiled array of displays. The control circuitry receives image data 600 representing the image to be displayed on the tiled array of displays. The image data 600 is passed to a demultiplexer 610 and a tile edge region detector 620. The demultiplexer 610 is arranged to separate the incoming image data 600 into image data representative of the image to be displayed at individual tiles of the tiled display. The separated image data is passed to the appropriate respective individual tiles 650a, b and c. The tile edge region detector 620 is arranged to detect parts of the incoming image data 600 which are close to an inter-tile boundary. The edge regions do not necessarily need to correspond to the areas of further pixels, but can extend beyond this, potentially to include the entire tile. The image data categorised by the tile edge region detector 620 as being at a tile edge is passed to an image type detector 630. The image type detector 630 detects whether the image data relates to (for instance) text/graphics only data or data comprising image, the result of this detection being used to generate a control signal 640 to be passed to the demultiplexer. The demultiplexer 610 includes information regarding the guard pixels in the image data to be sent to the tiles 650a, b and c, in response to the control signal 640.

FIG. 8 is a schematic side elevation of an array of light transmission guides 80''' coupled to pixel elements 100''' on an image output surface 60'''. The coupling is such that lateral movement between the light transmission guides 80''' and the image output surface 60''' is not completely inhibited.

In this example arrangement, each light transmission guide 80''' receives light from a rectangular array of 4×4 pixel elements 100'''. The arrangement shown in FIG. 7 illustrates the light transmission guides exactly covering the active pixel region 170 of the image output surface 60'''. However, if any expansion occurs in which the image guide expands to a greater extent than the panel display, the image guide will tend to move outwards in a direction 190. This will bring the outer most light transmission guide over pixels in the guard band 180.

FIG. 9 is a schematic plan view of the arrangement of FIG. 8, showing one corner of the image output surface 60''' including the guard band 180 which is a row of pixels two pixels wide running around the active pixel area 170.

FIG. 10 is a schematic plan view of an array of light transmission guides 80'''' coupled to an image output surface 60'''' in accordance with a fourth embodiment of the present invention.

FIG. 11 is a schematic side elevation of the arrangement of FIG. 10, in which the spacing between the light transmission guides 80'''' has been exaggerated for clarity.

Each light transmission guide 80'''' overlies a respective pixel element, although other arrangements as described above are of course possible. The light transmission guides 80'''' are separated by gaps 200 which are filled with a compressible material such as an open cell foam adhesive.

Surrounding the whole array of light transmission guides 80''' at their input end, is a rigid frame 210 formed of a material having substantially identical thermal expansion properties to that of the image output surface 60''''. Generally, this will be a glass material, but it has been found that metals may also be used as they have thermal expansion properties which are much closer to those of glass than to those of plastics or polymers.

For some display types, such as LC displays, the image output surface 60'''' may include a layer formed of a material having different thermal expansion properties to the frame 210. For instance, with LC displays, the image output surface 60'''' may have a polymeric film acting as a polariser adhered to it. In this case, where a polymeric polarising film is adhered to an underlying structure (which may for instance be formed of glass), the expansion properties of the polarising film will remain substantially those of the underlying structure, with the polarising film being "stretched" as the underlying structure expands (and compressed as the underlying structure contracts). Although the frame 210 may be coupled to the polarising film, because the expansion of the film will be determined by the thermal expansion properties of the underlying structure, the thermal expansion properties of the frame 210 should be substantially the same as those of the underlying structure. If some differential expansion occurs, the whole array of light transmission guides 80'''' cannot expand at their input end (in a lateral direction) beyond the rigid frame 210. The frame in turn expands at substantially the same rate as the image output surface 60''''.

So, expansion at the input end of the light transmission guides is taken up by the compressible material in the gaps 200. Assuming that the gaps are relatively uniformly filled, this provides a uniform compression of the compressible material across the array of light transmission guides 80''''. This in turn means that the alignment or registration between the light transmission guides at their input end and pixel elements on this image output surface 60'''' is not compromised.

Preferably, the means by which the frame 210 is attached to the array of light transmission guides 80'''' will conserve the optical characteristics that exist between non-peripheral fibres in the array. Embodiments of the invention which address this are illustrated in FIGS. 16a and 16b. There may be an inner frame 212 of a material having the substantially similar optical characteristics to the light transmission guides 80'''' and being coupled to the peripheral light transmission guides (i.e. those adjacent to the frame) in a manner that is optically substantially identical to the manner in which the light transmission guides 80'''' are attached to each other. The inner frame 212 would be sandwiched between the outer row of light transmission guides 80'''' and the outer frame 211 (which would lend rigidity to the structure). The inner frame 212 could for instance take the form of a continuous boundary of material surrounding all sides of the array or could comprise an additional boundary of light transmission guides 213 around the array. In the latter case, the additional light transmission guides 213 would be truncated so as not to reach the plane of the output ends of the light transmission guides 80''''. The outer frame 211 may have the same or similar optical characteristics to the light transmission guides 80'''', but different thermal expansion characteristics.

Preferably, light entering into the inner frame 212 will be prevented or at least inhibited from exiting the inner frame 212 in a manner that would degrade the visual properties of the display. For instance, where the inner frame 212 comprises truncated light transmission guides 213, these could have their truncated ends covered (e.g. coated) with a light absorbing layer. Alternatively, where the inner frame 212 comprises a continuous boundary of material, the part of its surface not in contact with the peripheral light transmission guides 80 could be covered (e.g. coated) with a light absorbing layer.

FIG. 12a schematically illustrates a side elevation view of a typical arrangement as described above and FIG. 12b schematically illustrates a plan view of the image output surface 60 of the same arrangement. In FIG. 12a, a single light guide 20 is coupled to an active region 170 of an image output surface 60. FIG. 12b shows that the input ends of light transmission guides 80 making up the light guide 20 are arranged to receive light from an active area 170 of the image output surface 60.

With this arrangement, each light guide 20 may be formed of an array of individual light transmission guides 80 (channels) that are close-packed as a regular array (typically square packed) at input and output with thin layers of glue between the light transmission guides. This packing configuration means that the array behaves more as a single large area (i.e. a continuous sheet) than as a group of individual light transmission guides (in terms of expansion) and the expansion in the plane parallel to the input apertures of the light transmission guides 80 and the image output surface 60 is cumulative. For instance, if each input aperture expands by 1% of its linear dimension then the linear expansion of the inputs of a close packed line of ten light transmission guides 80 will be approximately 10% of the linear dimension of a single light transmission guide 80.

For a large number of light transmission guides 80, the cumulative expansion of the input face of the light guide 20 relative to the lower expansion of the image output surface 60 (such as the modulator plane of a LC panel) may cause serious loss of registration if a large image output surface 60 (e.g. large area modulator of LC display) is used.

In an effort to contain the effect of the relative motion of the input ends of light transmission guides 80 relative to the pixel elements of the image output surface 60, the accumulation of the error should be limited. One method of addressing this problem is to limit the linear dimension of the input surface of the light guide 20. However, reducing the dimensions of the input surface of the light guide 20 necessitates using a larger number of reduced dimension output image surfaces (e.g. small modulating arrays) rather than a smaller number of regular image output surfaces (e.g. standard or large modulating arrays). It is desirable to use fewer image output surfaces 60 to reduce cost, improve efficiency and aid manufacturing.

FIGS. 12c and 12d schematically illustrate an alternative embodiment of the invention in which the input face of a light guide 20a is split into a plurality of groups 25a, b, c, d of light transmission guides 80 while a continuous array is maintained at the output face of the light guide 20a. FIG. 12d shows how the image output surface 60b comprises a plurality of active regions 170a, b, c and d, separated from each other by non-active regions 185, in this case a cruciform shape of "dead" or boundary pixels. Each group 25a, b, c, d of light transmission guides 80 is coupled to a different one of the active regions 170a, b, c or d and receives light from pixel elements in that active region. Fabricating a light guide 20a in this way, to have a plurality of (e.g. four) segments enables expansion to take place inwards (into the non-active regions 185 between the segments) as well as outwards, therefore reducing the degree of pixel-light transmission guide misregistration at the edges of the light guide 20a. For an input end which is divided into four sections, the linear dimensions of each section will be half the linear dimension of a continuous input end, minus half the desired dimension of the non-active area 185. For an N group by N group division, the degree of misaligmnent resulting from thermal expansion can be reduced to 1/N of that expected for a continuous input end. Additionally, it may be advantageous in helping to fill and index match the near planar area between the light guide input and the image output display surface (e.g. LC panel) to have four smaller areas rather than one large area, due to the difficulties involved in evenly applying index matching gel between two large-area planes.

It is possible to provide this arrangement with very little difference (or no difference at all) in the moulding (assuming for instance, that for a four group light guide, one quarter of a single row would usually be moulded as a single unit in the single group light guide embodiment).

In one embodiment, the displacement towards the centre (to cover the unused pixels of the image output surface 60a) is moulded into the quarter row (or whatever fraction of a row is moulded at one time) such that when the complete rows are assembled the output of the light guide 20a is continuous and the input of the light guide 20a has a cruciform gap that matches the active regions/modulation areas 170. The width of the gaps between the active areas of the image output surface 60a can be either small (e.g. 2 pixels=0.615 mm for 0.3075 mm pixels) or for wider (e.g. 20 pixels=6.15 mm for 0.3075 mm pixels).

The former (small width of unused pixels) is advantageous in one respect, because large areas of unused pixels on an image output surface 60a are wasteful and inefficient. A further advantage of having a gap at the centre of the image output surface 60a is that the expansion of the light guide 20a can take place inwards as well as outwards thereby reducing the loss of registration by a factor of approximately 2.

Where there is a very small gap (i.e. small number of unused pixels) between the active areas 170 on the image output surface 60a, it is not strictly necessary to mould the inward bend into the quarter (or other relevant fraction) row. Instead, because the displacement is small and the resulting stresses would therefore also be small, the output apertures of the four quarters could be pushed together and glued during the assembly process, resulting in a more straightforward manufacturing process.

The latter (wider width of unused pixels) has a different advantage in that it allows the possible addition of a registration aid between the respective groups of input ends of the light guide 20a. The registration aid may be attached to the image output surface 60a of the display device. FIG. 12e schematically illustrates a display arrangement comprising a registration aid 300. The registration aid 300 could take the form of a cruciform frame attached to the image output surface 60a (e.g. a metal or glass frame fixed to the output glass of an LC panel) such that the input channels can be butted against it as a means of registering it or even of securing it. Further possible forms include unconnected bars (illustrated schematically in FIG. 13a), connected or interlocking bars, and 'L' shaped objects to locate corners of the input end of the light guide 20a (illustrated schematically in FIGS. 13b and 13c). Expansion would be outwards from the points of contact between the light guide 20a and the registration aid 300. Preferably, the registration aid 300 would be made of glass having the same or similar thermal expansion properties to the image output surface 60a. Registration aids can also be provided in non-active areas external to the regions between the active areas.

Figure 13A:
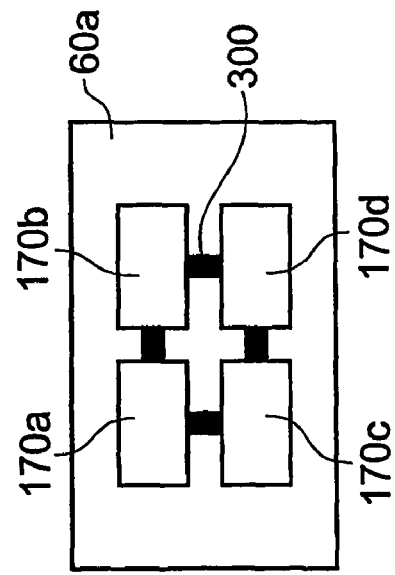
Figure 13B:
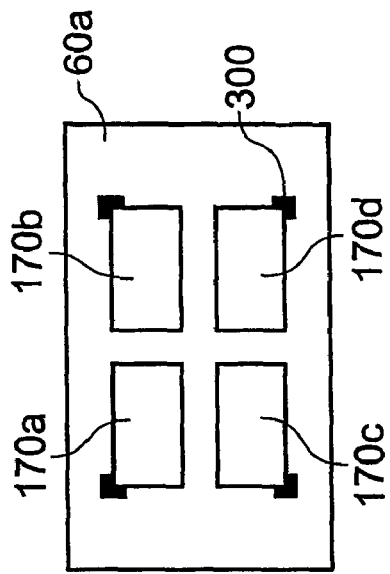
Figure 13C:
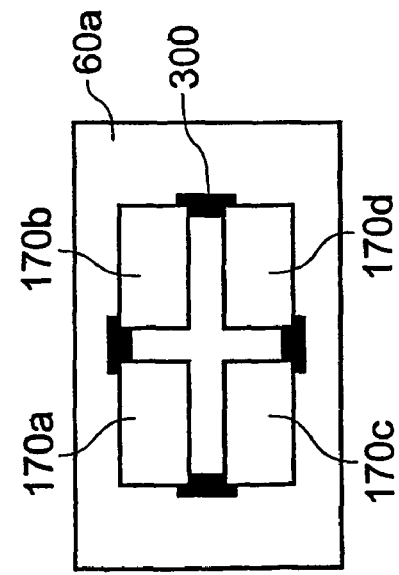
Figure 13D:
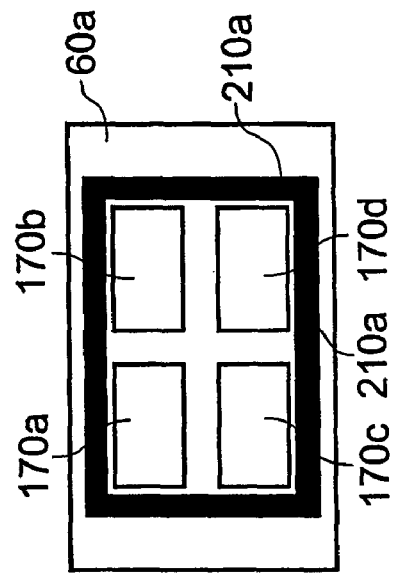

A further embodiment of the invention, illustrated schematically in FIG. 13d provides a frame 210a which constrains the periphery of the input face of the light guide 20a The input face would be "shoehorned" into the frame 210a on assembly of the unit. The lack of adhesive between the sections allows expansion to occur inwards from the frame 210a.

In the case of, for instance, an LC display, the image output surface 60 may have a different (e.g. lower) coefficient of thermal expansion (CTE) than a light guide 20 coupled to it. If the image output surface 60 and the light guide 20 are attached together by means of a rigid, or semi-rigid adhesive, the adhesive layer will become stressed in conditions where the temperature varies from the temperature at which the attachment was made. Consequently, mechanical distortion of the light guide 20 and/or the image output surface 60 (or the LC display itself) may arise. This mechanical distortion may adversely affect the performance of the display, and may ultimately lead to failure of the adhesive bond and thus to the decoupling of the image output surface 60 and the light guide 20. On the other hand, if the adhesive layer used is elastically compliant, then misregistration between the pixels of the active area 170 of the display 60 and the light transmission guides 80 of the light guide 20 may occur.

An alternative method of attaching a light guide to an image output surface is schematically illustrated in FIG. 14. In this arrangement, instead of using a continuous layer of adhesive, an adhesive 400 is confined to a small area, the dimensions of which should be sufficient to support its share of the display mass attached to a light guide 20b. The adhesive 400 is disposed centrally in the integral area of the light guide 20b. The remainder of the area between the light guide 20b and an image output surface 60c that is required to be optically coupled is filled with a gel having an extremely high viscosity or an elastomeric resin having an extremely low modulus of elasticity such that expansion differences produce no significant stress within the layer, and having substantially the same refractive index as the adhesive 400.

A suitable combination of adhesive 400 and low modulus elastomer would be Dymax X413-25-A (refractive index, n=1.42) as the adhesive 400 and Dow Corning 787T (refractive index, n=1.428) as the elastomer. Other suitable adhesives include Norland NOA81 (refractive index, n=1.56), Dymax OP4-20655 (refractive index, n=1.48) and Dymax OP4-20641 (refractive index, n=1.505). These could be used with gels such as LS-3238 Curing Encapsulation Gel (refractive index, n=1.38), LS-3246 (refractive index, n=1.46), LS-3249 (refractive index, n=1.49), LS-3252 (refractive index, n=1.52) and LS-3357 (refractive Index, n=1.57). These adhesives may be advantageous over the lower refractive index combination above, having refractive indices between those of a polarising layer present on the image output surface, and of the light transmission guides 80, where the light transmission guides 80 are formed of polycarbonate.

In the embodiment of FIG. 14, the adhesive 400 alone may not provide sufficient torsional rigidity to prevent misregistration through rotation of the light guide 20*b* and the image output surface 60*c* with respect to each other. To overcome this, two (or more) reference points 410 are glued rigidly to the image output surface 60*c*. The reference points 410 comprise low modulus glue that will yield to expansion forces resulting from variations in temperature.

With this arrangement, strain is allowed to occur at minimum stress by using adhesive over only a small area of the interface between the image output surface 60*c* and the light guide 20*b*. This advantageously provides that the area of rigid or semi-rigid adhesive sufficiently small to reduce stresses within the adhesive layer and that any expansion will take place symmetrically from the centre of the display, halving the misalignment compared to a method that fixes alignment from one corner of the display.

FIG. 15 schematically illustrates another embodiment which uses a small area of adhesive 400 to fix a light guide 20*c* to an image output surface 60*d*. In FIG. 15, the light guide 20*c* is split into a plurality of groups of light transmission guides 80 (in this case, four groups) as described above with reference to FIG. 12, in an arrangement otherwise similar to that described with reference to FIG. 14. Here, where multiple input segments of the light guide 20*c* are used, registration points 410 on the image output surface are not required, since sufficient torsional rigidity can be provided by the multiple adhesive areas 400.

Although the above embodiments of the invention are described such that the light transmission guides 80 of the light guide 20 are attached directly to the image output surface 60 of the display device, the ends of the light transmission guides 80 could also be attached to a substrate having substantially the same expansion properties as the display device. The substrate could be removably coupled to the image output surface 60 of the display device.

This arrangement might be more desirable than attaching the light transmission guides 80 directly to the display device (for yield, cost and maintenance reasons). The ends of the light transmission guides 80 could be glued directly to a substrate by applying glue to the ends of the light transmission guides 80 or to the substrate, placing the light transmission guides 80 row by row accurately in position using a linear stage or stages and holding the light transmission guides 80 in position whilst the glue is cured. This would avoid the need for the blades 140 described in relation to FIG. 6.

The invention claimed is:

1. An image display comprising:
a display device having an image output surface at which an image is displayed as a spaced array of pixel elements over an active pixel region of the image output surface;
an image guide coupled to the active pixel region of the image output surface and comprising a plurality of light transmission guides each having an input end and an output end, the input ends of the light transmission guides being arranged relative to one another so that groups of one or more light transmission guides receive light from respective groups of one or more pixel elements; in which:
the image output surface has further pixel elements disposed around the periphery of the active pixel region; and
the image guide can expand thermally so that the input of the image guide encompasses the further pixels.

2. The image display according to claim 1, in which the image output surface has further pixel elements disposed around the periphery of the active pixel region over a guard band region narrower than the input end of a light transmission guide.

3. The image display according to claim 1, in which each light transmission guide is arranged to receive light from two or more pixel elements.

4. The image display according to claim 1, in which the further pixels are arranged to display substantially the same picture information as nearby pixels within the active pixel region.

5. The image display according to claim 1, wherein the display includes:
a tiled array of displays arranged so that viewing surfaces formed by the output ends of the image guides abut to form a larger composite viewing surface;
in which the further pixels are arranged to display substantially the same picture information as pixels within the active pixel region of an adjacent display in the tiled array which are adjacent to the further pixels in the composite viewing surface.

6. The image display according to claim 1, wherein the display includes:
a tiled array of displays arranged so that viewing surfaces formed by the output ends of the image guides abut to form a larger composite viewing surface;
in which the further pixels are selectably operable to display either substantially the same picture information as pixels within the active pixel region of an adjacent display in the tiled array which are adjacent to the further pixels in the composite viewing surface or substantially the same picture information as nearby pixels within the active pixel region of the same display.

7. The image display according to claim 6, wherein the picture information displayed by the further pixels is user selectable.

8. The image display according to claim 6, wherein the picture information displayed by the further pixels is automatically selected on the basis of predetermined criteria.

9. The image display according to claim 8, further comprising a detector for detecting the type of information being displayed by the nearby pixels and selecting the picture information displayed by the further pixels on the basis of the detection result.

10. The image display according to claim 9, wherein if the detector detects information having at least a threshold rate of change of contrast and/or hue, the picture information displayed by the further pixels will be selected to be substantially the same picture information as nearby pixels within the active pixel region of the same display.

11. The image display according to claim 9, wherein if the detector detects information having less than the threshold rate of change of contrast and/or hue, the picture information displayed by the further pixels will be selected to be substantially the same picture information as pixels within the active pixel region of an adjacent display in the tiled array which are adjacent to the further pixels in the composite viewing surface.

* * * * *

UNITED STATES PATENT AND TRADEMARK OFFICE
CERTIFICATE OF CORRECTION

| | | Page 1 of 1 |
|---|---|---|
| PATENT NO. | : 7,742,120 B2 | |
| APPLICATION NO. | : 10/513835 | |
| DATED | : June 22, 2010 | |
| INVENTOR(S) | : P. A. Bayley et al. | |

It is certified that error appears in the above-identified patent and that said Letters Patent is hereby corrected as shown below:

| COLUMN | LINE | |
|---|---|---|
| Title page item [57] | 9 | "one or for a cluster" should read --one or more pixel elements; in which, for a cluster-- |

Signed and Sealed this

Twenty-sixth Day of April, 2011

David J. Kappos
*Director of the United States Patent and Trademark Office*